United States Patent
Brittles et al.

(10) Patent No.: US 8,621,010 B2
(45) Date of Patent: Dec. 31, 2013

(54) METHOD AND SYSTEM FOR PROTECTING MESSAGING CONSUMERS

(75) Inventors: William Brittles, Hampshire (GB); Paul Andrew Titheridge, Hampshire (GB); Nathalie De Meyer, Toronto (CA); Christopher Matthewson, Eastleigh (GB); Simon Gormley, Scottish Borders (GB)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 12/405,359

(22) Filed: Mar. 17, 2009

(65) Prior Publication Data
US 2009/0240777 A1    Sep. 24, 2009

(30) Foreign Application Priority Data
Mar. 17, 2008    (EP) .................................... 08152852

(51) Int. Cl.
*G06F 15/16* (2006.01)

(52) U.S. Cl.
USPC ........... 709/206; 709/200; 709/207; 719/313; 719/314

(58) Field of Classification Search
USPC .................. 709/200, 206, 207; 719/313, 314
See application file for complete search history.

(56) References Cited

U.S. PATENT DOCUMENTS

| | | | |
|---|---|---|---|
| 5,982,893 A * | 11/1999 | Hughes | 705/75 |
| 6,732,175 B1 * | 5/2004 | Abjanic | 709/227 |
| 6,775,691 B1 * | 8/2004 | Kubik et al. | 709/206 |
| 6,816,865 B2 * | 11/2004 | O'Brien et al. | 1/1 |
| 6,973,481 B2 * | 12/2005 | MacIntosh et al. | 709/206 |
| 7,178,099 B2 * | 2/2007 | Meyer et al. | 715/210 |
| 7,287,060 B1 * | 10/2007 | McCown et al. | 709/206 |
| 7,290,105 B1 * | 10/2007 | Jeter et al. | 711/163 |
| 7,404,212 B2 * | 7/2008 | Radatti et al. | 726/24 |
| 7,496,628 B2 * | 2/2009 | Arnold et al. | 709/206 |
| 7,509,573 B1 * | 3/2009 | Jones et al. | 715/234 |
| 7,512,711 B1 * | 3/2009 | Abjanic et al. | 709/246 |
| 7,516,182 B2 * | 4/2009 | Goldman | 709/206 |
| 7,756,930 B2 * | 7/2010 | Brahms et al. | 709/206 |
| 7,991,845 B2 * | 8/2011 | Quick et al. | 709/206 |
| 8,028,085 B2 * | 9/2011 | Elien et al. | 709/238 |
| 8,135,796 B1 * | 3/2012 | Slaughter et al. | 709/217 |
| 2002/0169841 A1 * | 11/2002 | Carlson et al. | 709/206 |
| 2004/0030788 A1 * | 2/2004 | Cimo et al. | 709/229 |
| 2004/0088357 A1 * | 5/2004 | Harding | 709/206 |

(Continued)

OTHER PUBLICATIONS

Claudiu N. Musat, "Layout Based SPAM Filtering", Mar. 12, 2006, WASET ORG, pp. 161-164.*

*Primary Examiner* — Anthony Mejia
(74) *Attorney, Agent, or Firm* — Novak Druce Connolly Bove + Quigg LLP

(57) ABSTRACT

The present invention is directed to a system, method, and computer-program product for protecting messaging consumers. According to one embodiment of the invention, a method for protecting messaging consumers can be provided. The method can include intercepting a message prior to arrival at a destination, comparing the message to one or more known message structures to determine the message structure, and determining if a message has a valid message structure for the destination. Intercepting a message prior to arrival at a destination may intercepts a message on a queue before the message is consumed by a consumer. Comparing the message to known message structures compares a message to message schemas, for example, XML schema, Java object definition or C structure format.

17 Claims, 6 Drawing Sheets

(56) References Cited

U.S. PATENT DOCUMENTS

| | | | |
|---|---|---|---|
| 2004/0205133 A1* | 10/2004 | Adler | 709/206 |
| 2004/0221295 A1* | 11/2004 | Kawai et al. | 719/313 |
| 2004/0260776 A1* | 12/2004 | Starbuck et al. | 709/206 |
| 2005/0021644 A1* | 1/2005 | Hancock | 709/206 |
| 2005/0044154 A1* | 2/2005 | Kaminski et al. | 709/206 |
| 2005/0080819 A1* | 4/2005 | Russell | 707/104.1 |
| 2005/0108345 A1* | 5/2005 | Suzuki | 709/206 |
| 2005/0108360 A1* | 5/2005 | Zellner | 709/217 |
| 2005/0138210 A1* | 6/2005 | Shkvarchuk et al. | 709/246 |
| 2005/0193073 A1* | 9/2005 | Mehr et al. | 709/206 |
| 2005/0198154 A1* | 9/2005 | Xie et al. | 709/206 |
| 2005/0232291 A1* | 10/2005 | Brown et al. | 370/428 |
| 2005/0262205 A1* | 11/2005 | Nikolov et al. | 709/206 |
| 2005/0278452 A1* | 12/2005 | Tankov et al. | 709/230 |
| 2006/0031360 A1* | 2/2006 | Banks et al. | 709/206 |
| 2006/0101148 A1* | 5/2006 | Herrmann | 709/227 |
| 2006/0136932 A1* | 6/2006 | Bose et al. | 719/314 |
| 2006/0149823 A1* | 7/2006 | Owen et al. | 709/206 |
| 2007/0061402 A1* | 3/2007 | Mehr et al. | 709/206 |
| 2007/0083591 A1* | 4/2007 | Sengodan | 709/204 |
| 2007/0098013 A1* | 5/2007 | Brown et al. | 370/466 |
| 2007/0101007 A1* | 5/2007 | Brown et al. | 709/228 |
| 2007/0118874 A1* | 5/2007 | Adams et al. | 726/1 |
| 2007/0143411 A1* | 6/2007 | Costea et al. | 709/206 |
| 2007/0271342 A1* | 11/2007 | Brandt et al. | 709/206 |
| 2008/0098406 A1* | 4/2008 | Quick et al. | 719/314 |
| 2008/0168136 A1* | 7/2008 | Choi | 709/204 |
| 2008/0281920 A1* | 11/2008 | Rosu | 709/206 |
| 2009/0049200 A1* | 2/2009 | Lin et al. | 709/246 |
| 2009/0049530 A1* | 2/2009 | Zellner | 726/4 |
| 2009/0063418 A1* | 3/2009 | Robie | 707/3 |
| 2009/0063498 A1* | 3/2009 | Rodriguez et al. | 707/10 |
| 2009/0125593 A1* | 5/2009 | Hiir et al. | 709/206 |
| 2009/0240780 A1* | 9/2009 | Brown et al. | 709/206 |
| 2009/0307771 A1* | 12/2009 | Rajan et al. | 726/22 |
| 2010/0106782 A1* | 4/2010 | Huang et al. | 709/206 |

* cited by examiner

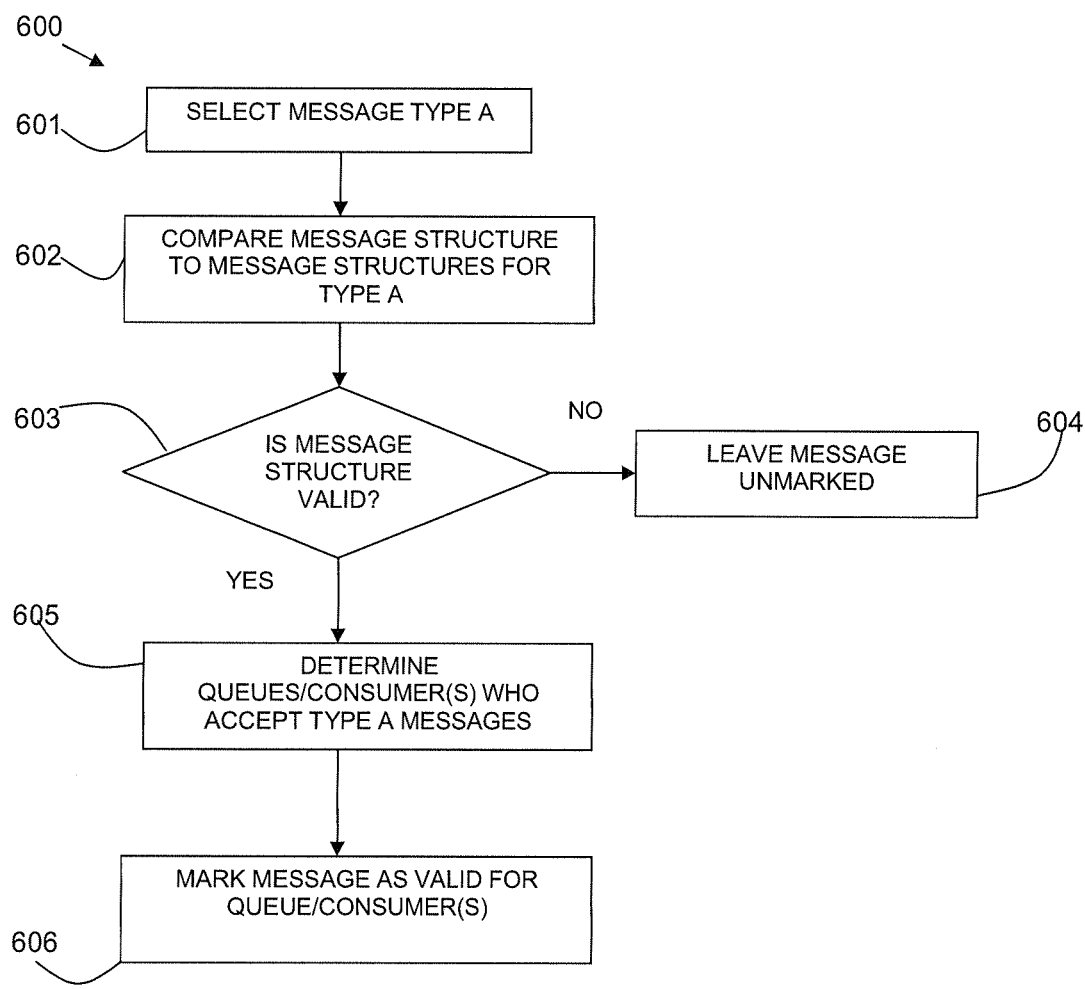

METHOD AND SYSTEM FOR PROTECTING MESSAGING CONSUMERS

CROSS-REFERENCE TO RELATED APPLICATION

This application claims the benefit of European Patent Application 08152852.3, filed on Mar. 17, 2008, which is hereby incorporated by reference.

FIELD OF THE INVENTION

This invention relates to the field of protecting messaging consumers. In particular, the invention relates to protecting messaging consumers from invalid data.

BACKGROUND OF THE INVENTION

Messaging systems are used to transmit data to consumers. In messaging systems, data intended for a consumer is placed on a message queue whereby the messaging system stores the data until the consumer retrieves the data. The messaging systems can be complex, involving multiple queues, multiple applications, routing of messages and intermediary applications that may alter the content of the message.

The messaging systems are not normally aware of the content of the message, nor the type and structure of messages expected at a particular queue. Messages may contain invalid data when created, or be altered on route to become invalid. It is also possible for messages to be delivered to the wrong queue.

Messaging consumers (also referred to as receivers or listening applications) service queues in the messaging system and expect messages to arrive in a certain format. If messages have been corrupted or delivered to the wrong queue, these poison messages can cause errors in the consumer. Message consumers are unable to handle some of their received messages, because they cannot cope with messages of certain received types or formats.

It is possible to include complex code in the consumer to validate the structure of each message, but this is error prone and expensive to maintain.

In conventional solutions, a message which cannot be handled by the consumer is put back on the input queue and is then retried, rejected, retried and rejected, until a failure count is reached. The message is then transferred to a 'dead letter queue' for clean up. This is acceptable for some consumers since the message retrievals and replacements that precede the message being placed on the dead letter queue are typically handled quickly and efficiently between the consumer and queue manager.

Placing the onus on the consumer to determine the validity of the message increases the quantity of application logic, as an application developer has to consider not only the cases where the message content is valid, but also the invalid case. This increases the complexity and development time of such consumer messaging applications. In systems where the message is rolled back to the messaging system, the consumer also needs to ensure that all other work has been done within a transaction and is rolled-back, or otherwise undone. Repeated-rolled back messages may be redelivered to the consumer, and could cause the messaging system to abort processing of the queue. Therefore, application development time is increased to handle invalid messages and/or application execution time is increased during the processing of invalid messages.

This conventional approach is not acceptable for all customers. Some customers (such as banks, airlines and other large corporations) rely on messaging systems to handle very large numbers of business-critical messages and they demand highly robust message delivery and processing. Their message consuming applications tend to be written with a highly cautious approach to problem messages, taking exceptional actions for any application exception that is triggered by identification of a problem message. Such customers often require assured message delivery but they also often want a guaranteed 'high quality' of messages reaching their consumer applications, i.e. they want to see minimal exceptions.

Typical messaging middleware does not provide guarantees that the messages will be acceptable to the consumer. It cannot do so because the messaging paradigm tends to implement the middleware functions without consideration of the particular requirements of individual applications, while the applications are shielded from the complexity of the middleware. This either leaves the consumers with sole responsibility for handling problem messages or relies on failure counts as mentioned above.

SUMMARY OF THE INVENTION

According to a first aspect of the present invention there is provided a method for protecting messaging consumers, comprising: intercepting a message prior to arrival at a destination; comparing the message to one or more known message structures to determine the message structure; and determining if a message has a valid message structure for the destination.

Intercepting a message prior to arrival at a destination may intercept a message on a queue before the message is consumed by a consumer. A destination may be a consumer in the form of a consumer application or message driven bean (MDB).

Comparing the message to known message structures may compare a message to message schemas. The method may include treating a message as invalid if it does not match a known message structure.

The step of determining if a message has a valid message structure for the destination compares the message structure with a stored list of valid message structures for a destination. If a message structure is determined as valid for a destination, it may be marked as valid and retrievable by a consumer. If a message structure does not match a stored list of valid message structures for a destination, the message may be treated as invalid.

Treating a message as invalid may include sending the message to an invalid message queue for processing or deleting the message.

A message structure may be one of: XML (extended Markup Language) message, Java object (Java is a trade mark of Sun Microsystems, Inc.), and C structure. Comparing the message to known message structures may include comparing the message to an XML schema, Java object definition or C structure format.

According to a second aspect of the present invention there is provided a computer program product stored on a computer readable storage medium for protecting messaging consumers, comprising computer readable program code means for performing the steps of: intercepting a message prior to arrival at a destination; comparing the message to one or more known message structures to determine the message structure; and determining if a message has a valid message structure for the destination.

According to a third aspect of the present invention there is provided a method of providing a service to a customer over a network, the service comprising: intercepting a message prior to arrival at a destination; comparing the message to one or more known message structures to determine the message structure; and determining if a message has a valid message structure for the destination.

According to a fourth aspect of the present invention there is provided a validation system including a processor for protecting messaging consumers, comprising: an interceptor for intercepting a message prior to arrival at a destination; means for comparing the message to one or more known message structures to determine the message structure; and means for determining if a message has a valid message structure for the destination.

The system may be an extension to a messaging middleware system or integrated into a messaging middleware system.

The content of messages sent between applications tends to be well defined and structured. Using the defined content of a message, it is possible for an entity external to the application to determine if the message is valid for a particular consumer.

BRIEF DESCRIPTION OF THE DRAWINGS

There are shown in the drawings, embodiments which are presently preferred. It is expressly noted, however, that the invention is not limited to the precise arrangements and instrumentalities shown. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features. The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 6 is a flow diagram of a second embodiment of a method in accordance with the present invention.

DETAILED DESCRIPTION

It is an aim of the present invention to provide a method and system in which the consumer does not receive invalid messages, so that the complexities and additional effort required by the consumer to deal with them are avoided.

It is a further aim of the present invention to provide a method and system that determines whether the data contained within the message is valid for the receiving application and treats it accordingly.

The invention proposes a mechanism in a messaging system or used in conjunction with a messaging system that is aware of the types of messages that can be processed by a consumer. The mechanism queries the message content. If the message is determined to be valid, it is allowed to be processed as normal. If not, the message is treated according to user defined rules, for example, it could be routed to a holding queue, or discarded.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
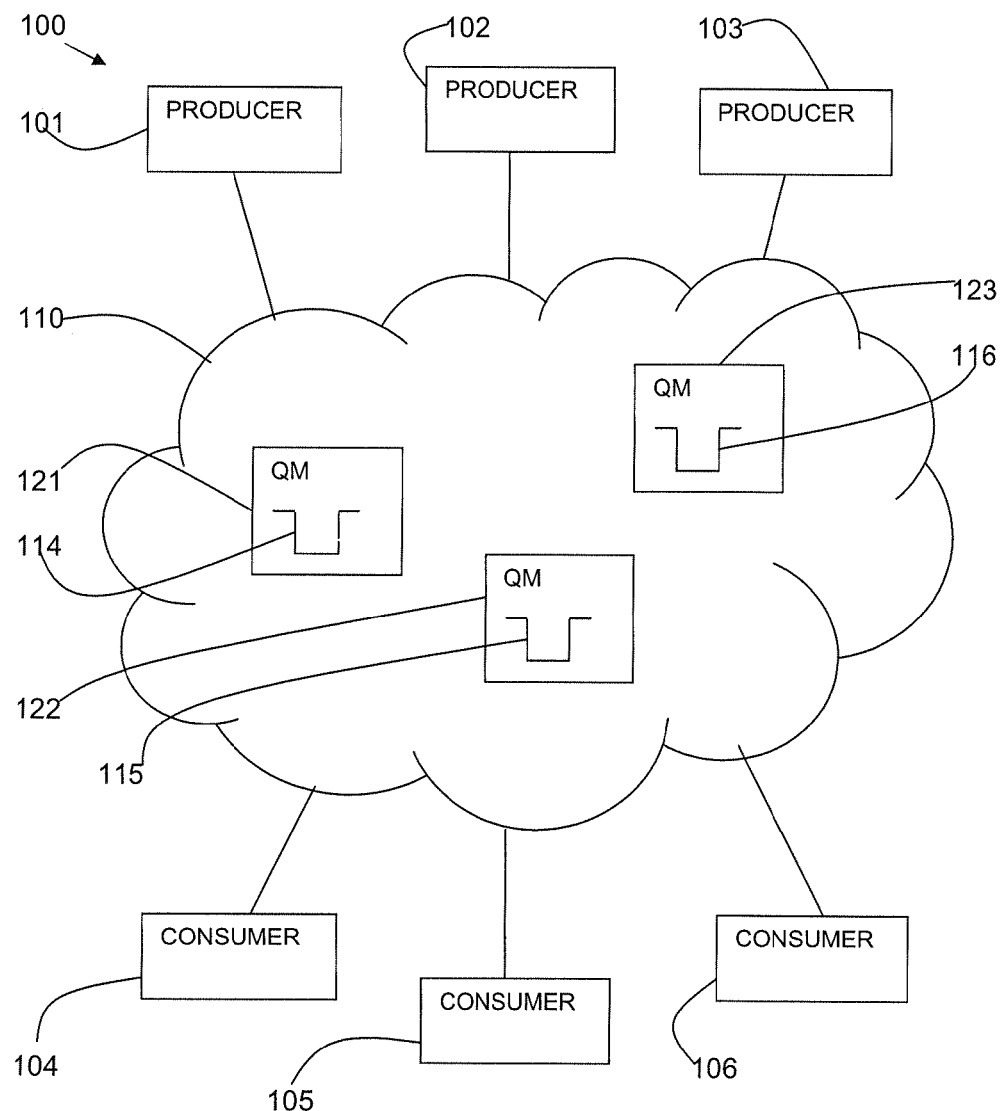
FIG. 1 is a block diagram of a messaging environment in which the present invention may be implemented.

Referring to FIG. 1, a general illustration of a messaging environment 100 is provided. A messaging environment 100 may take many different forms of varying complexity and FIG. 1 is intended as an example illustration only. The messaging environment 100 includes one or more message producers 101-103 and one or more message consumers 104-106. A single entity may be both a message producer and consumer. The message producers 101-103 and consumers 104-106 may be messaging applications or Message Driven Beans (MDBs).

A messaging system 110 handles the message delivery between producers 101-103 and consumers 104-106. The messaging system 110 can be complex, involving multiple queues, multiple applications, routing of messages and intermediary applications that may alter the content of the message, etc. In messaging systems 110, data intended for a consumer 104 is placed by a producer 101 on a message queue 114-116. The messaging system 110 stores the data until the consumer 104 retrieves the data.

In some messaging environments 100, a messaging system 110 includes one or a network of message brokers which receive incoming messages and perform actions on the messages such as routing, transforming, aggregating and decomposing messages, interaction with an external repositories to augment a message or store it, invoking Web services to retrieve data, respond to events or errors, provide content and topic-based message routing using the publish/subscribe model. The message queues 114-116 may be, for example, held by a queue manager 121-123 of one or more brokers.

Figure 2:
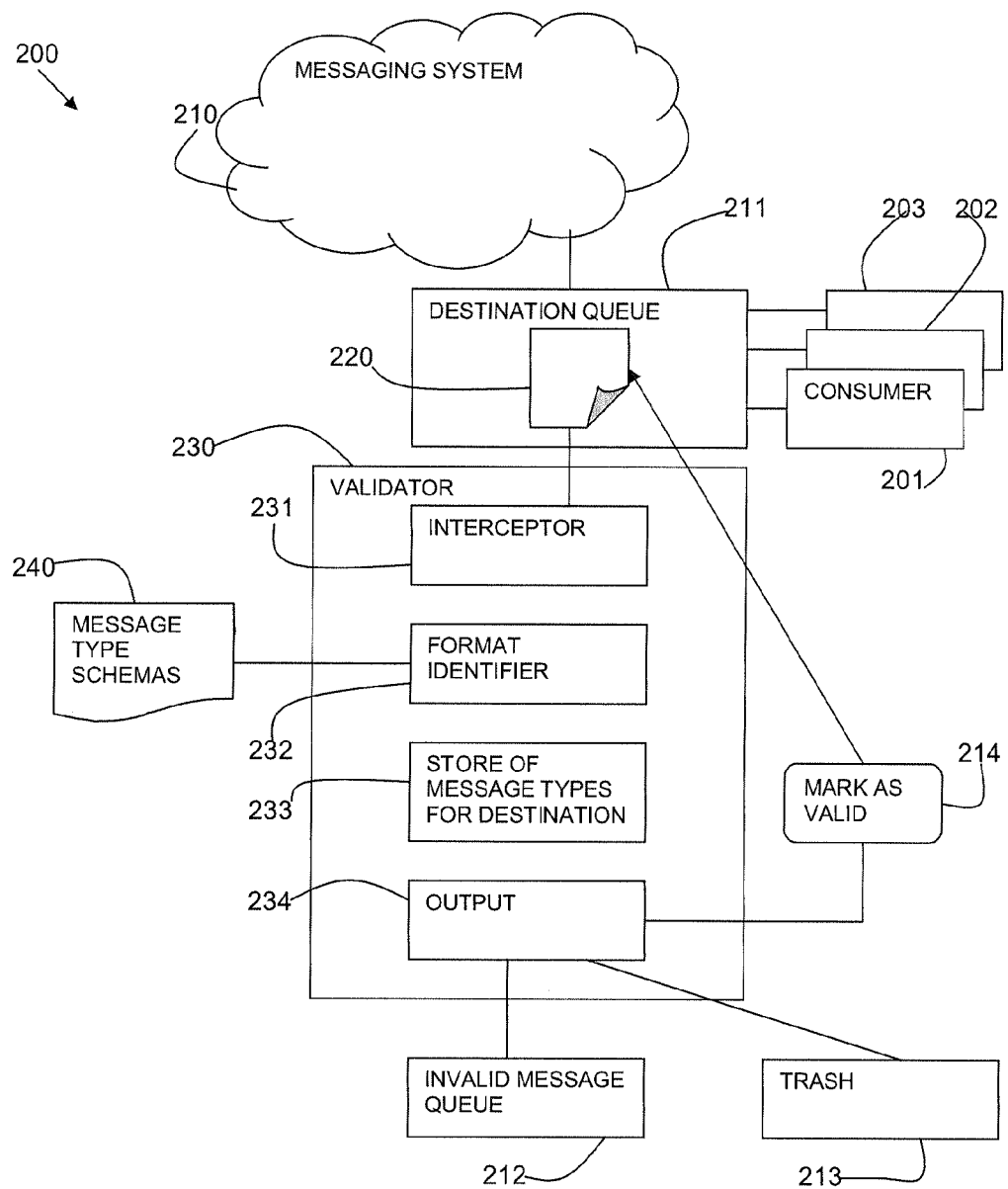
FIG. 2 is a block diagram of a first embodiment of a system in accordance with the present invention.

Referring to FIG. 2, a block diagram shows a messaging environment 200 with a messaging system 210. The messaging system 210 is shown generally in a cloud as it may take many different forms which are not relevant to the described system. The messaging system 210 results in a message 220 to be delivered to a consumer 201.

A validation component 230 is provided between the messaging system 210 and the consumer 201 which validates messages 220 before they are delivered to or retrieved by a consumer 201.

The validation component 230 may take various different forms. In one embodiment, the validation component 230 may be generic and supplied by or integrated into a messaging system. In another embodiment, the validation component 230 may be custom built for a customer as a message consumer and provided as a separate component to the customer. In a further embodiment, the validation component 230 may be provided by a server as a service over a network for message validation by clients prior to delivery.

A message 220 arrives on a queue 211 as normal, but is not processed by a consumer 201 until the validation component 230 has finished validating it. The consumer 201 only reads/consumes messages 220 that have been marked or indicated as being valid.

The validation component 230 includes a message interceptor 231 for intercepting messages before they are accessed by a consumer 201. The validation component 230 also includes a message format identifier 232 which compares a message format to message schema content definitions. The message schema content definitions may be retrieved by the validation component 230 from a resource 240 which may be stored in the validation component 230 or may be accessed from an external source.

The message format identifier 232 of the validation component 230 may be one of several known XML (eXtended Markup Language) schema, Java (Java is a trade mark of Sun Microsystems, Inc.) object type description, or C structure validators.

An XML schema may be used to validate XML messages. An XML schema is a description of a type of XML document, typically expressed in terms of constraints on the structure and content of documents of that type, above and beyond the basic syntax constraints imposed by XML itself. An XML schema provides a view of the document type at a relatively high level of abstraction. There are languages developed specifically to express XML schemas. The Document Type Definition (DTD) language, which is native to the XML specification, is a schema language that is of relatively limited capability, but that also has other uses in XML aside from the expression of schemas. Two other very popular, more expressive XML schema languages are XML Schema (W3C) and RELAX NG. The mechanism for associating an XML document with a schema varies according to the schema language. The association may be achieved via markup within the XML document itself, or via some external means.

For example, in the case of an XML schema validator, the Apache Xerces (Apache Xerces is a trade mark of The Apache Software Foundation) programming library may perform the message format checks.

The validation component 230 includes a store 233 of message types which are valid for a message destination. The message destination may be a message consumer 201 or a plurality of message consumers 201-203. The message types may be stored for the requirements of message consumers 201 that service a particular queue 211. More than one consumer 201-203 may service a queue 211. For performance reasons, there are generally only multiples of the same type of message consumer 201-203 servicing a queue 211.

The validation component 230 also includes an output means 234 for handling the message depending on the outcome of the validation. A valid message may be marked as valid 214 on the queue 211 or even moved to a different "validated" queue. An invalid message may be marked as invalid, moved an invalid message store queue 212, or discarded 213.

A message 220 intended for the application queue 211 arrives from another part of the messaging system 210, which could be the sending application, another messaging system, or an intermediary application. Before the messaging system 210 makes the message available to the consumer 201, the validation component 230 checks that the message structure and content is valid according to the message schemas provided.

The validation component 230 is aware of the types of messages that can be processed on a particular queue 211 for consumer(s) 201 of that queue. The validation component 230 queries the message content or structure.

If the message 220 is determined to be valid it is allowed to be processed as normal and it is made available to the consumer 201. If not, the message 220 is treated according to user defined rules, for example it could be routed to a holding queue or invalid message store, or discarded. The message 220 can then be handled separately (for example, with operator intervention) without interrupting the consumer 201.

Figure 3:
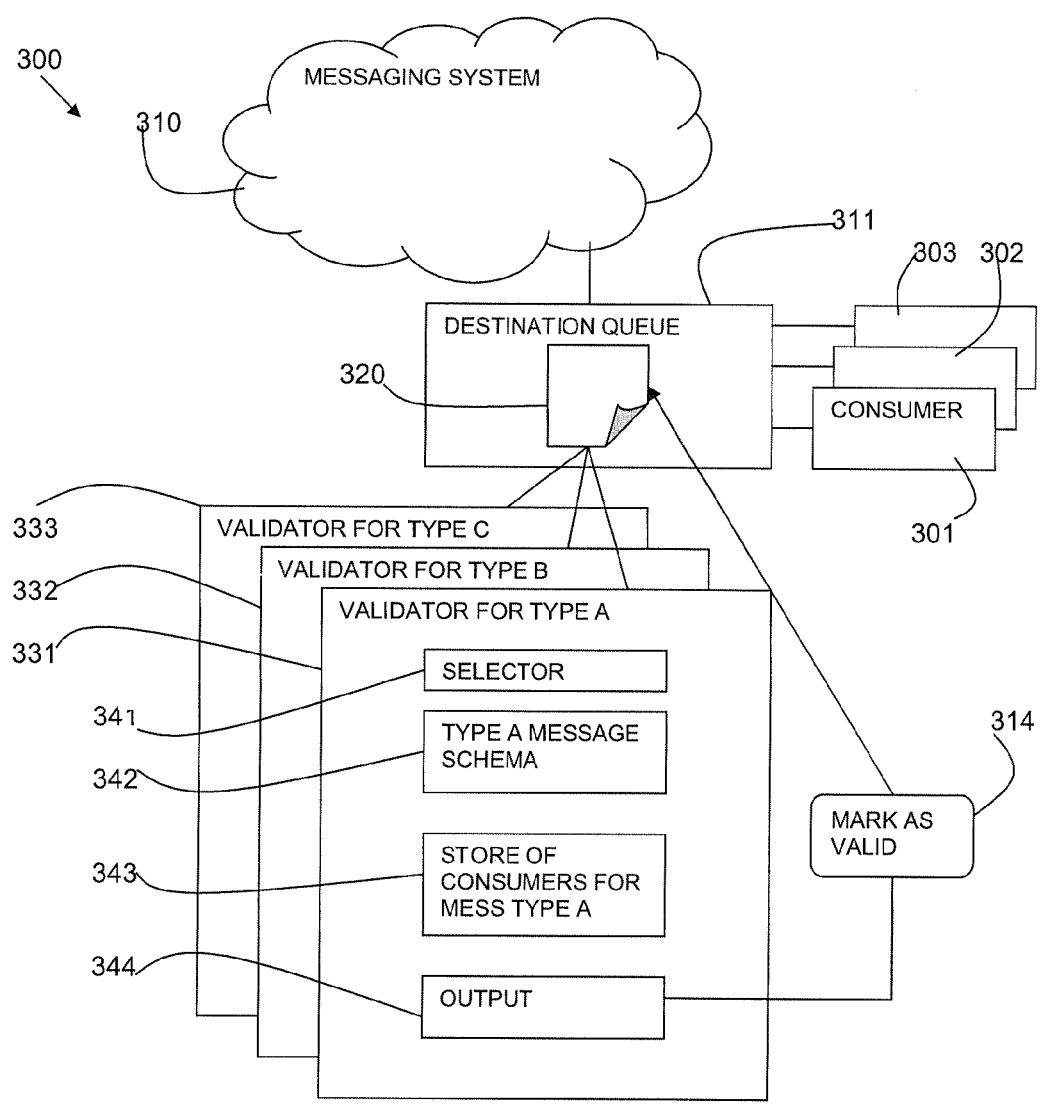
FIG. 3 is a block diagram of a second embodiment of a system in accordance with the present invention.

A second embodiment of the described system is shown in FIG. 3. A block diagram shows a messaging environment 300 with a messaging system 310 as in FIG. 2. The messaging system 310 results in a message 320 to be delivered to a consumer 301.

In this embodiment, the validation component provided between the messaging system 310 and the consumer 301 is formed of multiple validation components. Each validation component 331-333 validates a particular type of message 320 before it is delivered to or retrieved by a consumer 301.

A validation component 331-333 only validates a type of message, for example, using a message selector of message type="a". Multiple validation components 331-333 are run against the same queue 311. A multiple of differing consumers 301-303 would work in the same way, only reading messages that had been validated for a message type read by that consumer 301-303.

A validation component 331-333 for a type of message "a" includes a message selector 341, a message type "a" message schema 342 for checking the validity of the message format, a list 343 of consumers or queues who accept a messages of type "a", and an output 344.

The output 344 may mark a message 320 as being valid as a type "a" message, or if the list 343 of consumers or queues is provided in the validation component 331-333, the message 320 may be marked as valid for a specified consumer or queue.

If a message is not valid for a type of message, it is not marked and therefore not consumed by a consumer. A timeout of messages which are not validated on a queue may be provided.

The validation component filters out problem messages before passing any messages to the message consumer. In particular, the structure of a received message is validated against an imported message type description such as an XML schema or some Java message type description. The message type description represents the particular requirements of the message consumers that service a particular queue, so this validation can determine whether the message is valid for the particular queue and consumers.

In one embodiment, the validation component filtering could be provided by a set of configurable business rules implemented in a plug-in to existing messaging middleware. The rules can take account of the needs of a relevant set of consumers, which a more generic middleware product is not able to do. This shields the consumers from having to implement defensive checking code. There may be multiple consumers, each with different requirements that make use of a single validation component that is provided between a message queue manager and the consumers.

Multiple instances of validation components may run in parallel so that message throughput is not adversely affected.

Figure 4:
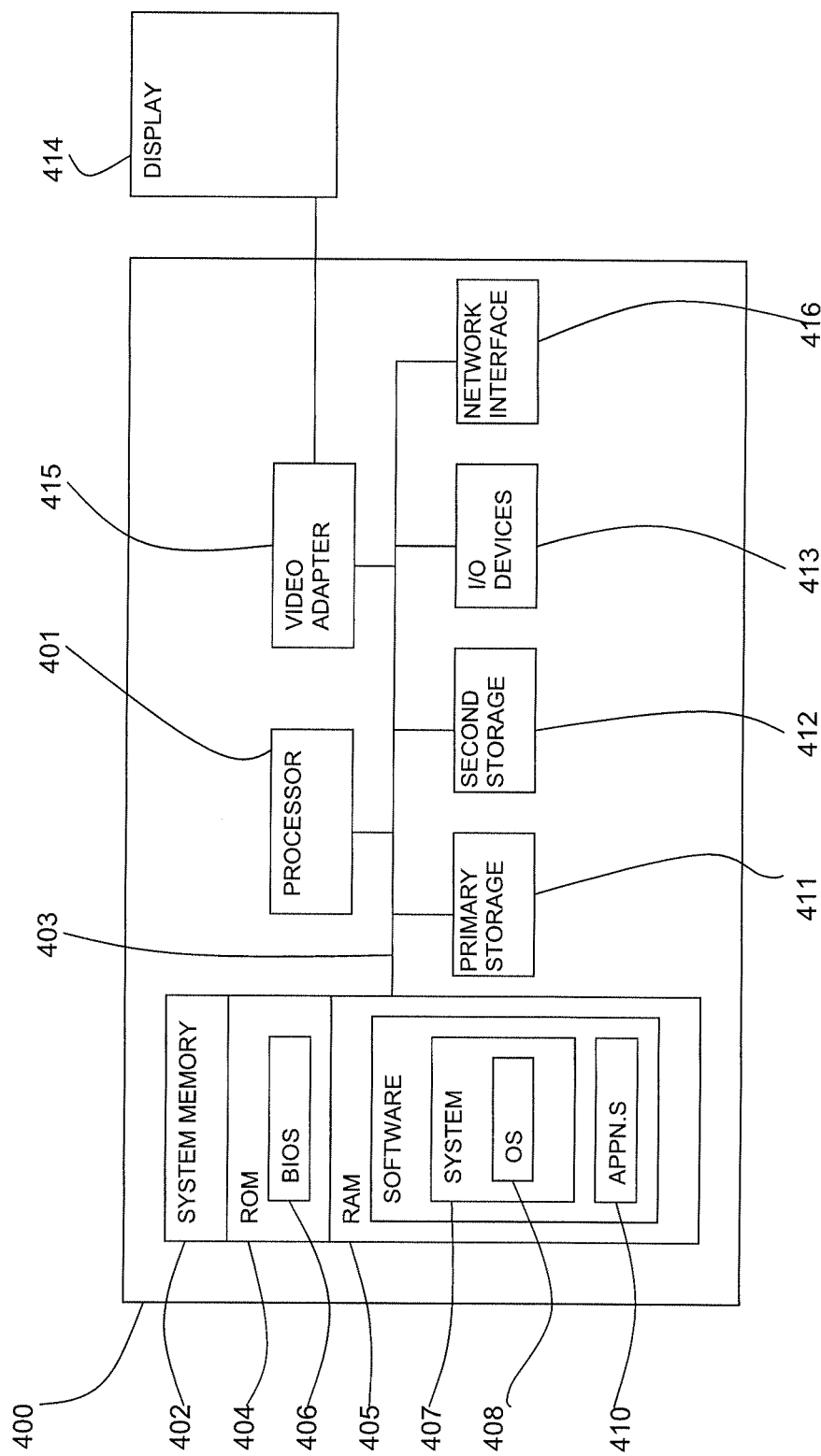
FIG. 4 is a block diagram of a computer system in which the present invention may be implemented.

Referring to FIG. 4, an exemplary system for implementing a system for supporting the validation component includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
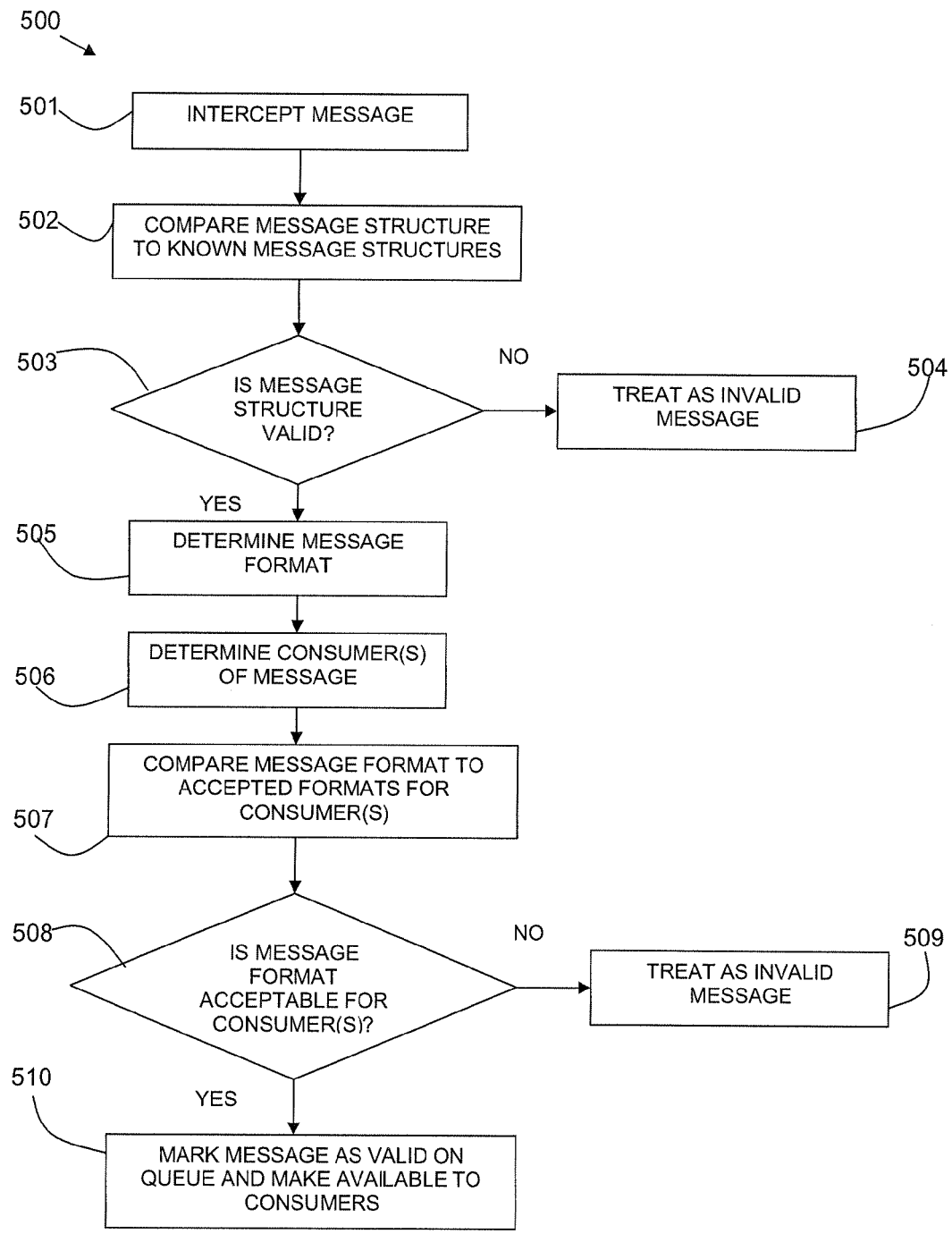
FIG. 5 is a flow diagram of a first embodiment of a method in accordance with the present invention.

Referring to FIG. 5, a flow diagram 500 shows a first embodiment of the described method. A message is intercepted 501 once it arrives on a queue, before it is read/retrieved by a consumer. The message structure is compared 502 to known message structures. It is determined 503 if the message structure is a valid structure. If it is not a valid message structure, the message is invalid 504 and treated accordingly.

If the message is a valid message structure, the message format is determined 505. The consumers servicing the queue are determined 506. The message format is compared 507 to accepted message formats for the consumers of the queue. It is then determined 508 if the message format is acceptable for the consumers of the queue. If so, the message is marked as valid 510 on the queue. If not, the message is treated as invalid 509. Consumers can only read/retrieve messages which have been marked as valid.

An invalid message may be handled in different ways depending on the system requirements. For example, the invalid messages may be discarded, or sent to an invalid message store for operator intervention.

Referring to FIG. 6, a flow diagram 600 shows a second embodiment of the described method. A message of type "a" is selected 601 from a queue, before it is read/retrieved by a consumer. The message structure is compared 602 to the known message structure for type "a" messages. It is determined 603 if the message structure is valid. If it is not valid for a type "a" message, the message is left unmarked 604 for validating as a different message type, as appropriate. If a message is left unmarked after having been checked by each available validation component for different types of message, a time-out mechanism may clear old unmarked messages from the queue.

If the message is a valid message structure, the method determines 605 the queues/consumers who accept type "a" messages. The message can then be marked 606 as valid for the specified queues/consumers.

In the described system, the message travels through the messaging system without interference until just before it is going to be consumed. Invalid messages arrive but are intercepted before they are retrieved from a queue and the consumer does not see them until they are verified as valid. This provides a system which can be implemented without interference with the messaging system and which is highly flexible.

The task of data validation is moved from the consumer application programmer and a large amount of validation code is therefore no longer needed at the consumer. A system administrator can handle the invalid messages allowing more flexibility during maintenance and upgrades. A system administrator can also keep a record of the nature and volume of invalid messages for analysis.

The described system also has advantages in storage-constrained systems and systems where a consumer is retrieving messages via a low-bandwidth connection. In such systems, a slower delivery is justified if it minimizes retries and additions to a dead letter queue.

The invention may be considered counter-intuitive because the validation slows message delivery for every message and problem messages should be few. Nevertheless, the method is useful since some consumers and customers are particularly sensitive to problem messages. There can also be problems if a dead letter queue fills up. For example, a decision has to be made whether to start rejecting additional messages, overwriting the dead letter queue etc.

Some enterprises have a highly cautious approach to problem messages, taking exceptional actions for any application exception that is triggered by identification of a problem message. Such enterprises often require assured message delivery but they may also want a guaranteed high quality of messages reaching their consumer applications. Such enterprises may be, for example, banks, airlines and other large corporations which rely on messaging systems to handle very large numbers of business-critical messages and they demand highly robust message delivery and processing.

Using the described validation component, an enterprise can choose whether it wishes to avoid the errors and the compensation mechanism offered by default and without having to write lots of client code. The described component offers a mechanism to avoid client side exceptions, transaction rollbacks, etc. The validation component can be configured by a client to handle invalid messages in a way required by the client.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A computer-implemented method for protecting messaging consumers, comprising:
    identifying an electronic message upon arrival in a queue accessible by a consumer and making the electronic message inaccessible by the consumer from the queue;
    comparing the electronic message to one or more known electronic message structures to determine a message structure of the electronic message;
    determining if the message structure of the electronic message has a valid electronic message structure for processing by a messaging application associated with the queue by comparing the message structure of the electronic message with a stored list of valid electronic message structures for a destination;
    wherein at least one of the valid electronic message structures is at least one of: XML (eXtended Markup Language) schema, Java object definition, and C structure format;
    in the queue, marking the electronic message as valid and retrievable by the consumer if the message structure is determined to be valid for the messaging application; and
    removing the electronic message from the queue if the electronic message remains unmarked for a pre-defined time period after arriving in the queue without interrupting the consumer.

2. The method as claimed in claim 1, wherein the destination is a consumer application or message driven bean (MDB) consumed by the consumer.

3. The method as claimed in claim 1, wherein the removing further comprises marking the electronic message as invalid, in response to the electronic message not matching any of the one or more known electronic message structures within the pre-defined time period.

4. The method as claimed in claim 1, wherein the removing further comprises sending the electronic message to an invalid message queue for processing.

5. The method as claimed in claim 1, wherein the removing further comprises deleting the electronic message.

6. A validation system for protecting messaging consumers, comprising:
    a processor configured for:
    identifying an electronic message upon arrival in a queue accessible by a consumer and making the electronic message inaccessible by the consumer from the queue;
    comparing the electronic message to one or more known electronic message structures to determine a message structure of the electronic message;
    determining if the message structure of the electronic message has a valid electronic message structure for processing by a messaging application associated with the queue by comparing the message structure of the electronic message with a stored list of valid electronic message structures for a destination;
    wherein at least one of the valid electronic message structures is at least one of: XML (eXtended Markup Language) schema, Java object definition, and C structure format;
    in the queue, marking the electronic message as valid and retrievable by the consumer if the message structure is determined to be valid for the messaging application; and
    removing the electronic message from the queue if the electronic message remains unmarked for a pre-defined time period after arriving in the queue without interrupting the consumer.

7. The system as claimed in claim 6, wherein the destination is a consumer application or message driven bean (MDB) consumed by the consumer.

8. The system as claimed in claim 6, wherein the removing further comprises sending the electronic message to an invalid message queue for processing.

9. The system as claimed in claim 6, wherein the removing further comprises deleting the electronic message.

10. The as claimed in claim 6, wherein the system is an extension to a messaging middleware system.

11. The as claimed in claim 6, wherein the system is integrated into a messaging middleware system.

12. The system as claimed in claim 6, wherein the removing further comprises marking the electronic message as invalid, in response to the electronic message not matching any of the one or more known electronic message structures within the pre-defined time period.

13. A non-transitory computer-readable storage medium having stored therein computer-readable instructions, which, when loaded in and executed by a computer causes the computer to perform the steps of:
    identifying an electronic message upon arrival in a queue accessible by a consumer and making the electronic message inaccessible by the consumer from the queue;
    comparing the electronic message to one or more known electronic message structures to determine a message structure of the electronic message;
    determining if the message structure of the electronic message has a valid electronic message structure for processing by a messaging application associated with the queue by comparing the message structure of the electronic message with a stored list of valid electronic message structures for a destination;
    wherein at least one of the valid electronic message structures is at least one of: XML (eXtended Markup Language) schema, Java object definition, and C structure format;
    in the queue, marking the electronic message as valid and retrievable by the consumer if the message structure is determined to be valid for the messaging application; and
    removing the electronic message from the queue if the electronic message remains unmarked for a pre-defined time period after arriving in the queue without interrupting the consumer.

14. The non-transitory computer-readable storage medium of claim 13, wherein the destination is a consumer application or message driven bean (MDB) consumed by the consumer.

15. The non-transitory computer-readable storage medium of claim 13, wherein the removing comprises sending the electronic message to an invalid message queue for processing.

16. The non-transitory computer-readable storage medium of claim 13, wherein the removing comprises deleting the message.

17. The non-transitory computer-readable storage medium of claim 13, wherein the removing further comprises marking the electronic message as invalid, in response to the electronic message not matching any of the one or more known electronic message structures within the pre-defined time period.

* * * * *